(12) United States Patent
Choltco-Devlin et al.

(10) Patent No.: US 12,071,988 B2
(45) Date of Patent: *Aug. 27, 2024

(54) SUSPENSION ENHANCING HUB AND REAR DERAILLEUR ASSEMBLY

(71) Applicant: Fox Factory, Inc., Duluth, GA (US)

(72) Inventors: Evan Michael Choltco-Devlin, North Vancouver (CA); Mark Stephen Fitzsimmons, Gilroy, CA (US); Wesley E. Allinger, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,988

(22) Filed: Aug. 18, 2022

(65) Prior Publication Data

US 2022/0389979 A1 Dec. 8, 2022

Related U.S. Application Data

(63) Continuation of application No. 16/694,732, filed on Nov. 25, 2019, now Pat. No. 11,428,279.

(Continued)

(51) Int. Cl.
*F16D 48/06* (2006.01)
*F16D 27/09* (2006.01)
(Continued)

(52) U.S. Cl.
CPC ........... *F16D 48/064* (2013.01); *F16D 27/09* (2013.01); *F16D 41/16* (2013.01); *F16D 41/30* (2013.01);
(Continued)

(58) Field of Classification Search
CPC ........ F16D 48/064; F16D 41/30; F16D 27/09; F16D 2121/20; F16D 2500/10493; F16D 2500/1107; B62M 9/122
See application file for complete search history.

(56) References Cited

U.S. PATENT DOCUMENTS

| 4,773,671 A | 9/1988 | Inagaki |
| 4,984,819 A | 1/1991 | Kakizaki et al. |

(Continued)

FOREIGN PATENT DOCUMENTS

| DE | 4340471 C1 | 2/1995 |
| DE | 202010016798 U1 | 3/2012 |

(Continued)

OTHER PUBLICATIONS

European Search Report for European Application No. 19211677.0, 7 pages, Apr. 20, 2020 (Apr. 20, 2020).

(Continued)

*Primary Examiner* — Timothy Hannon

(57) ABSTRACT

An electronic automatically decoupling hub assembly. The decoupling hub assembly has an axle and a hub shell rotationally positioned about the axle. A controller provides automatic activation/deactivation signals to an inductor. The decoupling hub assembly has a bearing rotationally positioned about the axle and a cassette body assembly, having a plurality of teeth, rotationally positioned about the bearing. One or more pawls are provided to engage with at least some of the teeth of the cassette body assembly and a seal is used to contain the pawls within the decoupling hub assembly. A cassette body assembly is coupled with the ratchet ring and an end cap is used to prevent a contaminant from entering into the decoupling hub assembly.

5 Claims, 13 Drawing Sheets

Related U.S. Application Data

(60) Provisional application No. 62/805,885, filed on Feb. 14, 2019, provisional application No. 62/772,504, filed on Nov. 28, 2018, provisional application No. 62/771,416, filed on Nov. 26, 2018.

(51) Int. Cl.
   *F16D 41/16* (2006.01)
   *F16D 41/30* (2006.01)
   *B62M 9/122* (2010.01)
   *F16D 121/20* (2012.01)

(52) U.S. Cl.
   CPC ......... *B62M 9/122* (2013.01); *F16D 2121/20* (2013.01); *F16D 2500/10493* (2013.01); *F16D 2500/1107* (2013.01)

(56) References Cited

U.S. PATENT DOCUMENTS

| | | |
|---|---|---|
| 5,027,303 A | 6/1991 | Witte |
| 5,105,918 A | 4/1992 | Hagiwara et al. |
| 5,390,949 A | 2/1995 | Naganathan et al. |
| 6,065,580 A | 5/2000 | Kirk |
| 6,244,398 B1 | 6/2001 | Girvin et al. |
| 6,427,812 B2 | 8/2002 | Crawley et al. |
| 6,863,291 B2 | 3/2005 | Miyoshi |
| 6,935,157 B2 | 8/2005 | Miller |
| 9,132,883 B2 | 9/2015 | Bettin |
| 9,475,547 B2 | 10/2016 | Jordan |
| 10,189,306 B2 | 1/2019 | Thoma et al. |
| 2003/0132600 A1 | 7/2003 | Miyoshi |
| 2010/0044180 A1 | 2/2010 | Chen |
| 2010/0252389 A1 | 10/2010 | French |
| 2011/0183805 A1 | 7/2011 | Chan |
| 2015/0204390 A1 | 7/2015 | Kimes |
| 2016/0160941 A1 | 6/2016 | Green et al. |
| 2017/0248174 A1 | 8/2017 | Greene et al. |
| 2018/0022201 A1 | 1/2018 | Samila et al. |
| 2019/0233053 A1 | 8/2019 | Chen et al. |
| 2019/0323568 A1 | 10/2019 | Uppal et al. |

FOREIGN PATENT DOCUMENTS

| | | |
|---|---|---|
| DE | 202015005747 U1 | 11/2016 |
| FR | 3012108 A1 | 4/2015 |
| WO | 2015013802 A1 | 2/2015 |
| WO | 2018144185 A1 | 8/2018 |

OTHER PUBLICATIONS

"Troy Brosnan's Custom 6-speed DH Cassette", https://www.vitalmtb.com/photos/features/PIT-BITS-Val-di-Sole-World-Cup-Downhill,11844/Troy-Brosnans-Custom-6-speed-DH-Cassette,123052/sspomer,2, Jul. 4, 2018.

Levy, "Canyon's Wild DH Drivetrain Disconnect—Eurobike 2016", https://www.pinkbike.com/news/canyon-project-disconnect-eurobike-2016.html, Sep. 1, 2016.

European Search Report for EP Application No. 22172854.6, 8 pages, Mailed Sep. 21, 2022.

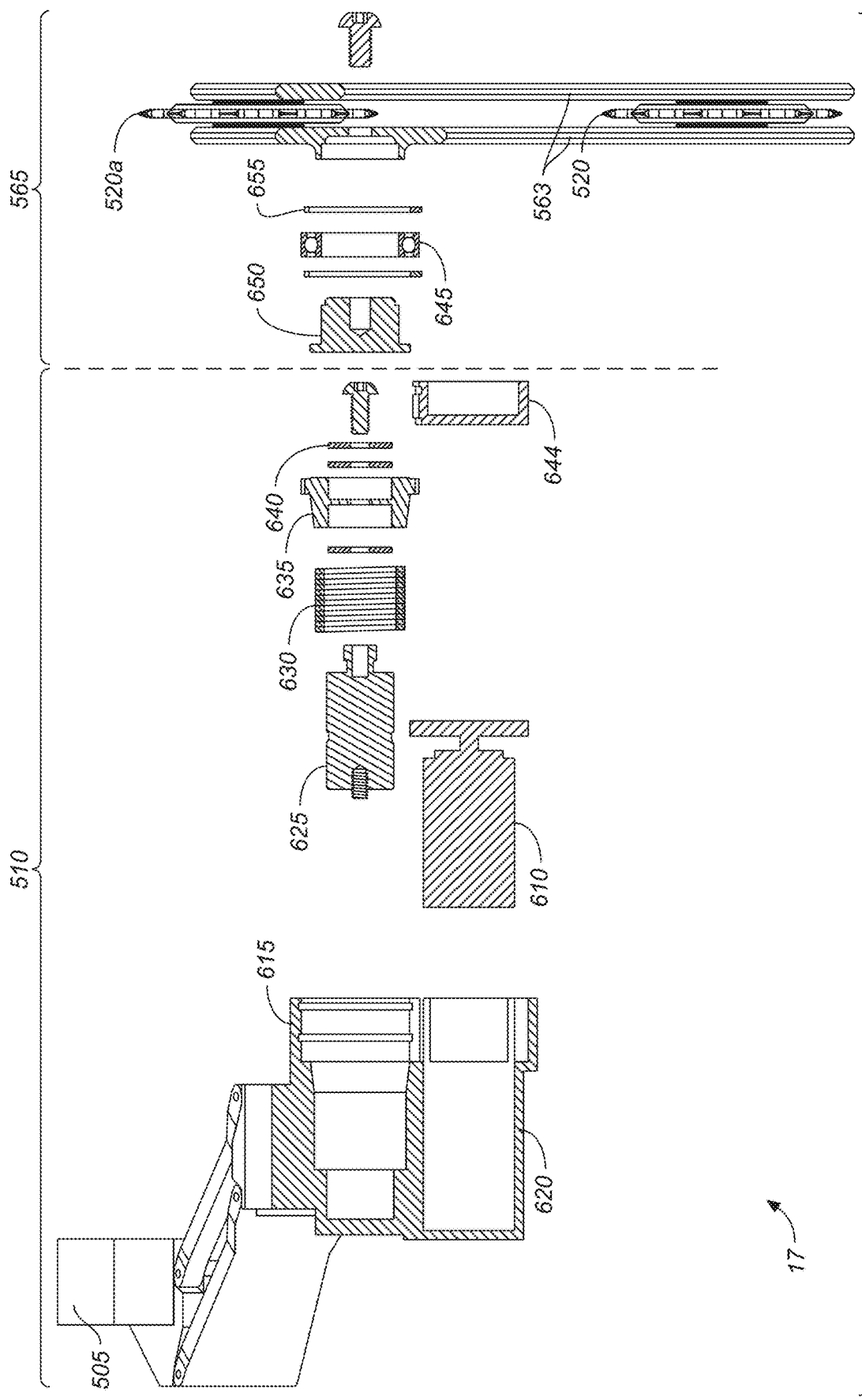

SUSPENSION ENHANCING HUB AND REAR DERAILLEUR ASSEMBLY

CROSS-REFERENCE TO RELATED APPLICATIONS

This application claims priority to and benefit of copending U.S. patent application Ser. No. 16/694,732, filed on Nov. 25, 2019, entitled "SUSPENSION ENHANCING HUB AND REAR DERAILLEUR ASSEMBLY" by Choltco-Devlin et al., and assigned to the assignee of the present application, the disclosure of which is hereby incorporated by reference in its entirety.

The application Ser. No. 16/694,732 claims priority to and benefit of the U.S. Provisional Patent Application No. 62/771,416 filed on Nov. 26, 2018, entitled "ELECTRONIC AUTOMATICALLY DECOUPLING HUB ASSEMBLY" by Allinger et al., and assigned to the assignee of the present application, the disclosure of which is hereby incorporated by reference in its entirety.

The application Ser. No. 16/694,732 claims priority to and benefit of the U.S. Provisional Patent Application No. 62/772,504 filed on Nov. 28, 2018, entitled "DISENGAGEABLE REAR DERAILLEUR ASSEMBLY" by Choltco-Devlin et al., and assigned to the assignee of the present application, the disclosure of which is hereby incorporated by reference in its entirety.

The application Ser. No. 16/694,732 claims priority to and benefit of the U.S. Provisional Patent Application No. 62/805,885 filed on Feb. 14, 2019, entitled "SUSPENSION ENHANCING HUB AND REAR DERAILLEUR ASSEMBLY" by Allinger et al., and assigned to the assignee of the present application, the disclosure of which is hereby incorporated by reference in its entirety.

FIELD OF THE INVENTION

Embodiments of the invention generally relate to a suspension enhancing hub and rear derailleur assembly for a bicycle.

BACKGROUND

Rear suspension assemblies are often utilized on bicycles to absorb energy imparted to the rear wheel by the terrain over which the bicycle is being ridden. The use of a rear suspension shock system allows a rider to traverse rougher terrain, at a greater speed and with less fatigue in comparison to riding a bicycle equipped with a rigid rear frame. However, due to the fact that the rear suspension can articulate, the distance between the center chain sprocket and the rear wheel sprocket can change causing changes in chain tightness. Such, suspension induced chain growth can have detrimental suspension performance impact and can provide deleterious feedback to a rider through the pedals, etc.

BRIEF DESCRIPTION OF THE DRAWINGS

Aspects of the present invention are illustrated by way of example, and not by way of limitation, in the accompanying drawings, wherein:

FIG. 6 is an exploded view of a disengageable derailleur assembly, in accordance with an embodiment.

The drawings referred to in this description should be understood as not being drawn to scale except if specifically noted.

SUMMARY

A derailleur having a cage assembly and a P-Knuckle assembly, wherein the cage assembly is selectively and frictionally engaged or disengaged from the P-Knuckle assembly. In addition, the derailleur allows the P-Knuckle assembly to retain orientation information with respect to the cage assembly during the frictional disengagement such that the derailleur will maintain the suspension position, gearing, and chain drift needs of the bicycle while allowing free movement of the cage assembly to eliminate most cage force that could adversely affect suspension performance.

The electronic automatically decoupling hub assembly wherein a number of the one or more pawls is analogous to the number of inductor/electromagnets.

The electronic automatically decoupling hub assembly wherein the controller provides a polarity to the inductors/electromagnets that push or pull the one or more pawls into an engaged position.

The electronic automatically decoupling hub assembly wherein the controller provides a polarity to the inductors/electromagnets that push or pull the one or more pawls into a disengaged position.

The electronic automatically decoupling hub assembly wherein an electromagnetic force is used to engage the pawls with cassette body assembly when the pawls are retracted in a resting state.

The electronic automatically decoupling hub assembly wherein an electromagnetic force is used to disengage the pawls with cassette body assembly when the pawls are deployed in a resting state.

The electronic automatically decoupling hub assembly further comprising: at least one sensor to provide an input signal to the controller, the input signal causing the controller to electronic automatically engage or disengage the pawls from the cassette body assembly.

The electronic automatically decoupling hub assembly wherein the sensor is selected one or more of the group of sensors consisting of: an accelerometer, an optical detection (e.g., infrared motion sensor), an image capturing device (e.g., optical flow), and a combination thereof.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Definitions

Figure 5A:
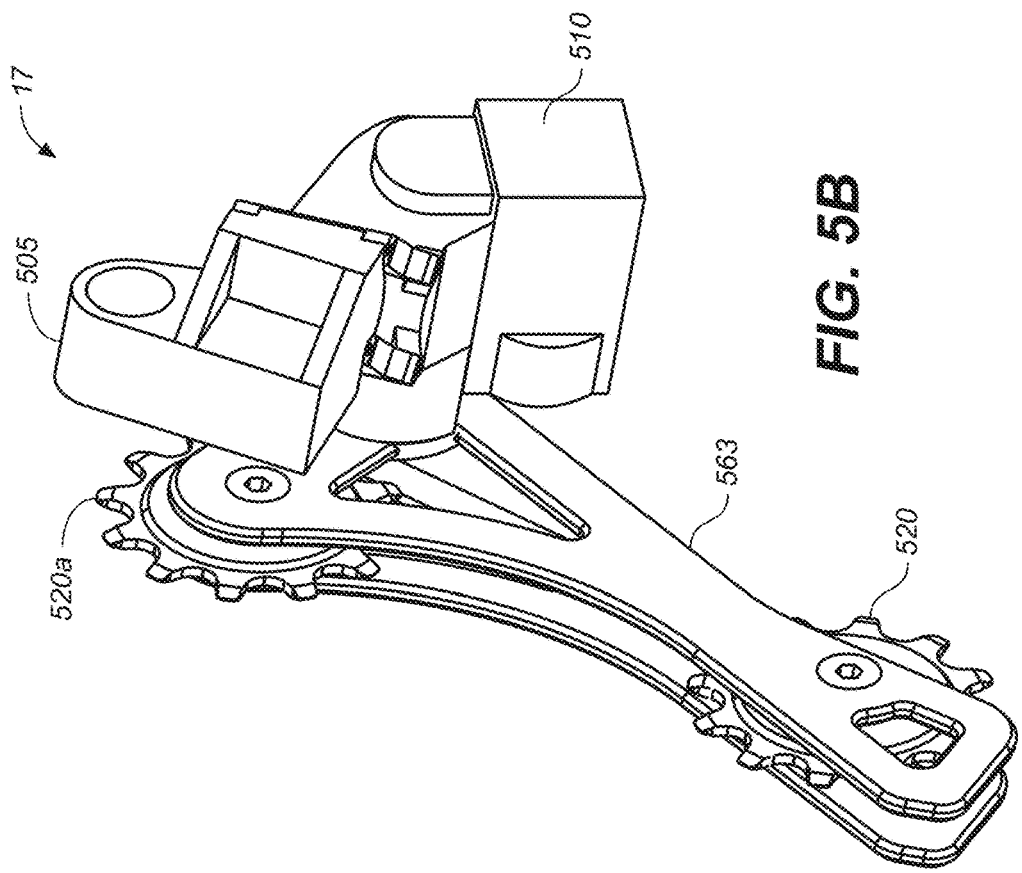
FIG. 5A is a perspective view of a disengageable derailleur assembly, in accordance with an embodiment.
Figure 5B:
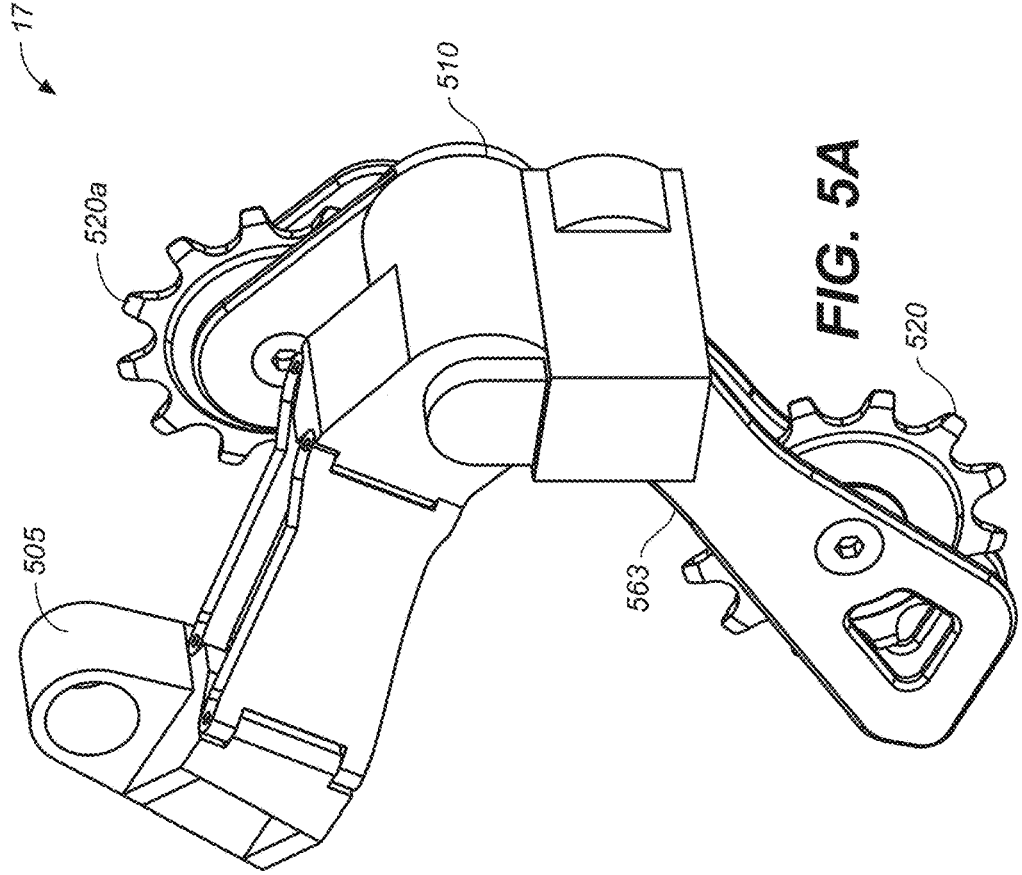
FIG. 5B is another perspective view of a disengageable derailleur assembly, in accordance with an embodiment.

In the following discussion, the disengageable derailleur assembly includes a P-Knuckle (Pully Knuckle) assembly and a cage assembly frictionally and mechanically coupled together to form a derailleur such as shown in FIGS. 5A and 5B and in further detail in FIG. 6.

In the following discussion the term disengageable derailleur assembly refers to the capability to modify the coefficient of friction between the P-Knuckle assembly and the cage assembly of the derailleur assembly. In one embodiment, a clutch plate is used to modify the coefficient of friction between the two assemblies. For example, when the coefficient of friction is high (e.g., the clutch plates are engaged), the P-Knuckle assembly and the cage assembly become fixedly coupled such that movement of the cage assembly causes movement of the P-knuckle assembly and vice versa. In contrast, when the coefficient of friction is low (e.g., when the clutch plates are separated), the P-Knuckle assembly disengages from the cage assembly such that the cage assembly is capable of movement about the coupling axis with the P-Knuckle assembly in an almost frictionless state. Therefore, when the P-Knuckle assembly and the cage assembly are frictionally disengaged, the feedback that is encountered by the suspension due to the input of the P-Knuckle assembly onto the cage assembly is significantly reduced.

The P-knuckle assembly is shown at P-Knuckle 510 of FIGS. 5A and 5B and further in detail in FIG. 6. In one embodiment, P-Knuckle assembly includes a P-Knuckle housing 615, a motor and gear 610, a spring (or solenoid) housing 620, a linear solenoid 625, a torsional power spring 630, a P-Knuckle clutch plate 635 (with gear), at least one thrust bearing 640, and a P-Knuckle cover 644. In one embodiment, a frame attachment portion 505 is also part of the P-Knuckle assembly 510.

The cage assembly: is illustrated herein as the cage assembly 565 of FIGS. 5A and 5B and further in detail in FIG. 6. In one embodiment, the cage assembly includes a cage bearing 645, a cage plate 650, at least one snap ring 655, inner and outer cage plates 563, lower idler pully 520, and upper idler pully 520a.

Although a plurality of different components is described, it should be appreciated that the disengageable derailleur assembly 17 can have more of fewer components. For example, a number of the components shown could be combined to a single component or could be broken from one into a plurality of components. Moreover, the disengageable derailleur assembly 17 could include more of fewer of the components shown. The use of the designated separate components defined as being part of P-Knuckle assembly 510 and cage assembly 565 in the discussion is provided as one embodiment, and is shown merely for purposes of clarity. It should be appreciated that in one embodiment, one or more of the components could be moved into the opposite assembly.

Chain stay length: The distance between bottom bracket (where the crank attaches to bicycle frame) and the rear wheel axis. On a rigid frame bike, unless the frame fails, the distance between the bottom bracket and the rear wheel axis will remain the same. However, on a rear suspension bicycle, unless the main suspension arm pivots directly about the bottom bracket axis, the chain stay length changes as the suspension pivots.

Pedal bob: A suspension motion caused when the rider is standing up and pedaling. As the rider reaches the bottom of the crank/pedaling circle, a dead spot is created in the pedal circle as the rider's weight momentarily comes to reset on the pedal that is at the bottom of the pedal circle and before the opposite leg can begins to pick up the rider weight on the opposite downward pedal stroke. Pedal bob wastes energy that is input into the bicycle as the suspension will absorb a portion of the energy in the form of suspension friction instead of using all of the input energy for propulsion.

Anti-squat: is a measure of how much the suspension and/or chain tension maintainer resists pedal bob.

Pedal kickback: if there are high levels of anti-squat, during times of sudden suspension compression, the suspension will not be able to absorb the compression and this will result in the crank being forced to rotate backwards due to the lengthening of the chain stay length occurring faster than the suspension and/or chain tension maintainer can increase the available operational length of chain.

In addition to improvement in pedal feedback, the disengaged freewheel mechanism will improve rear wheel traction. For example, when the hub is engaged, chain stay length increase will, along with inputting force into the rider's legs, also force the rear wheel to rotate forward. This rotation would be at a rate almost certainly different than the rate at which the wheel is moving over the ground, decreasing the wheel's ability to track terrain and decreasing traction.

However, by disengaging the hub, chain stay length increase will not deleteriously impact the rotation of the rear wheel. As such, the rotation of the rear wheel would remain the same rate at which the wheel is moving over the ground.

By removing any chain stay length increasing forces subjected to the rear wheel, the wheel will be able to track terrain and maintain whatever traction is presently available.

Rear derailleur: is used in a bicycle drive train to shift the drive chain across a number of rear cogs/sprockets to achieve different gear ratios depending on riding conditions and rider preference. The small cog in a current bicycle drive train is 9-12 teeth. The large cog can be as large as 42 teeth or more. Therefore, the rear derailleur acts as both a shifting mechanism, and a chain tensioner mechanism to accommodate the different lengths of chain required when shifting from the small cog to the large cog.

Embodiment of the present invention would not be obvious and in fact, are likely counter-intuitive to those of ordinary skill in the art because those in the art knows that it is important to maintain that spring force on the cage assembly in order to maintain chain tensioning. Maintaining chain tension is important to maintain chain retention such that the chain does not bounce off of a chain ring. However, the disclosed technology selectively engages and disengages the cage assembly from the P-Knuckle, such that the tension on the chain is relieved (due to the disengagement) when the chain growth is increasing. Moreover, (due to the re-engagement characteristics of the cage assembly with the P-Knuckle) tension is maintained when the chain growth is reduced or is no longer increasing.

Overview

In general, there are a number of difference rear suspension systems such as simple single-pivot, linkage-driven single pivot, Horst-link (four-bar), Twin-link (virtual pivot point), and the like. Further, the location of the pivot can be higher or lower on frame 24.

The use of a rear suspension shock system allows a rider to traverse rougher terrain, at a greater speed and with less fatigue in comparison to riding a bicycle equipped with a rigid rear frame. However, due to the fact that throughout a rear suspension articulation the distance between the center chain sprocket and the rear wheel sprocket can change, the accompanying chain growth can detrimentally affect the operation and feel of the rear suspension during compression and rebound.

Bikes utilized chain growth to affect certain suspension characteristics. In general, the chain growth is taken up by derailleurs to control the length of the chain deployed. However, when the derailleur is sprung it can detrimentally affect the suspension by adding additional forces to the suspension and therefore restrict the motion of the suspension.

Embodiments discussed herein provide a new and novel way to selectively and frictionally engage or disengage the cage assembly from the P-Knuckle assembly (e.g., the clutch plate from the P-Knuckle assembly frictionally engages or disengages with its cage assembly counterpart) and the freewheel mechanism of a hub from the suspension selectively, such as based on terrain, rider input, and the like. In so doing, and based on manual or automatic inputs from the bicycle system, the disengageable derailleur assembly can be disengaged when performance is paramount to eliminate the inefficiencies caused by suspension induced chain growth. Further, the disengageable derailleur assembly can be reengaged as needed to ensure the chain stays in an appropriate location to properly propel the bicycle. The inputs could be pedal movement, suspension movement, pitch of the bicycle, inputs from one or more sensors, chain tautness, and the like.

Operation

Figure 1:
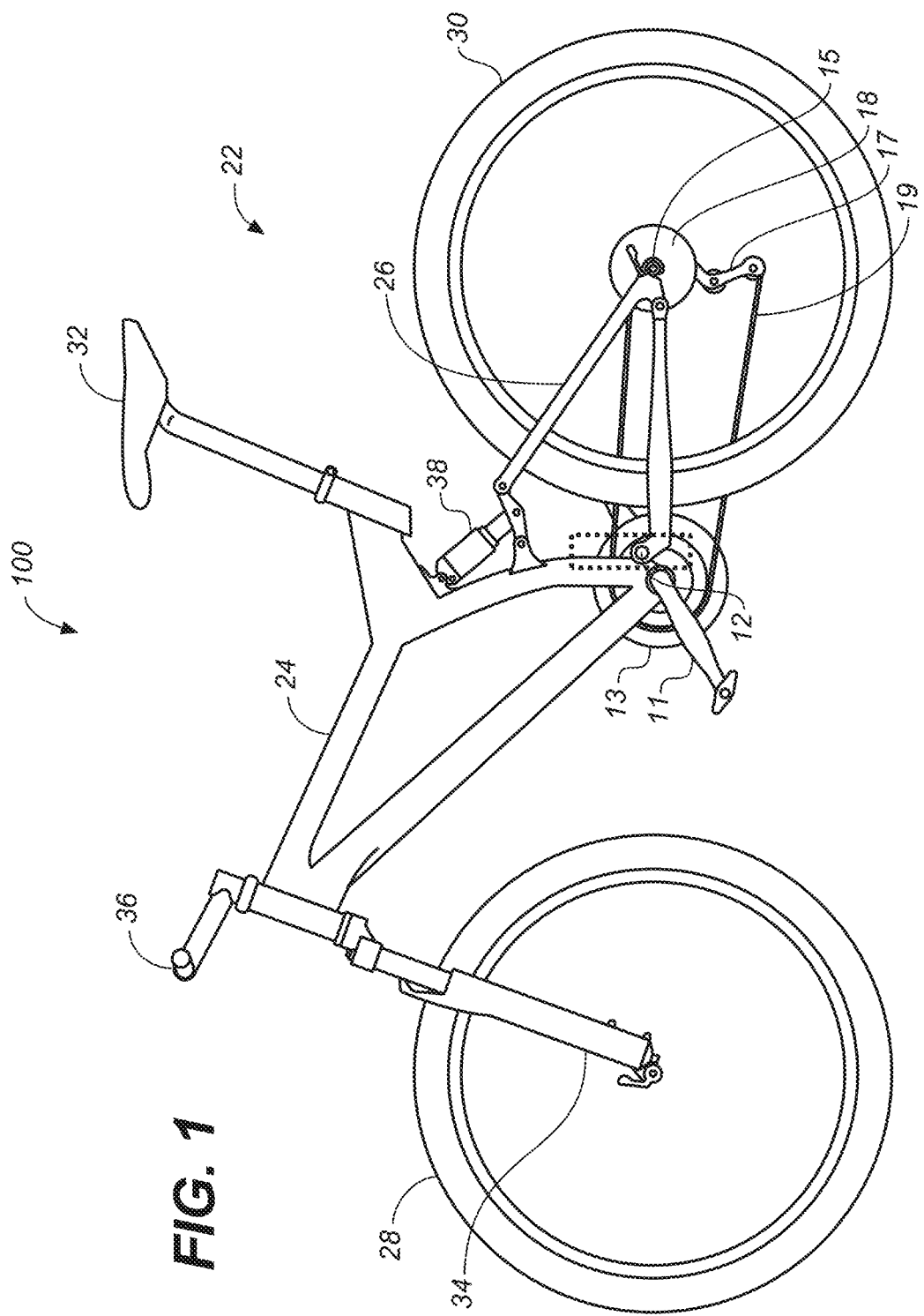
FIG. 1 is a perspective view of a bicycle having a rear suspension setup, in accordance with an embodiment.

FIG. 1 illustrates bicycle 100 having a frame 24 with a suspension system comprising a swing arm portion 26 that, in use, is able to move relative to the rest of frame 24; this movement is permitted by, inter alia, a rear shock absorber and/or damping assembly 38. The front forks 34 also provide a suspension function via a damping assembly in at least one fork leg; as such the bicycle 100 is a full suspension bicycle (such as an ATB or mountain bike), although the embodiments described herein are not limited to use on full suspension bicycles. In particular, the term "suspension system" is intended to include vehicles having front suspension or rear suspension only, or both. In one embodiment, swing arm portion 26 is pivotally attached to the main frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and front sprocket assembly 13. Bicycle 100 includes a front wheel 28 which is coupled to the main frame 24 via front fork 34 and a rear wheel 30 which is coupled to the main frame 24 via swing arm portion 26. A seat 32 is connected to the main frame 24 in order to support a rider of the bicycle 20.

The front wheel 28 is supported by a front fork 34 which, in turn, is secured to the main frame 24 by a handlebar assembly 36. The rear wheel 30 is connected to the swing arm portion 26 of the frame 22 at rear axle 15. A shock absorber (e.g., damper assembly 38) is positioned between the swing arm portion 26 and the frame 22 to provide resistance to the pivoting motion of the swing arm portion 26 about pivot point 12. Thus, the illustrated bicycle 100 includes a suspension member between swing arm portion 26 and the frame 24 which operate to substantially reduce rear wheel 30 impact forces from being transmitted to the rider of the bicycle 100.

Bicycle 100 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Optional chain tension device provides a variable amount of tension on chain 19. The need for chain 19 length variation can be due to a number of different gears that may be on one or both of front sprocket assembly 13 and/or rear sprocket 18 and/or changes in chain stay length as the distance between bottom bracket axis 11 (where front sprocket assembly 13 attaches to bicycle frame 24) and the rear axle 15 changes due to suspension articulation as shown in further detail in herein.

Figure 2:
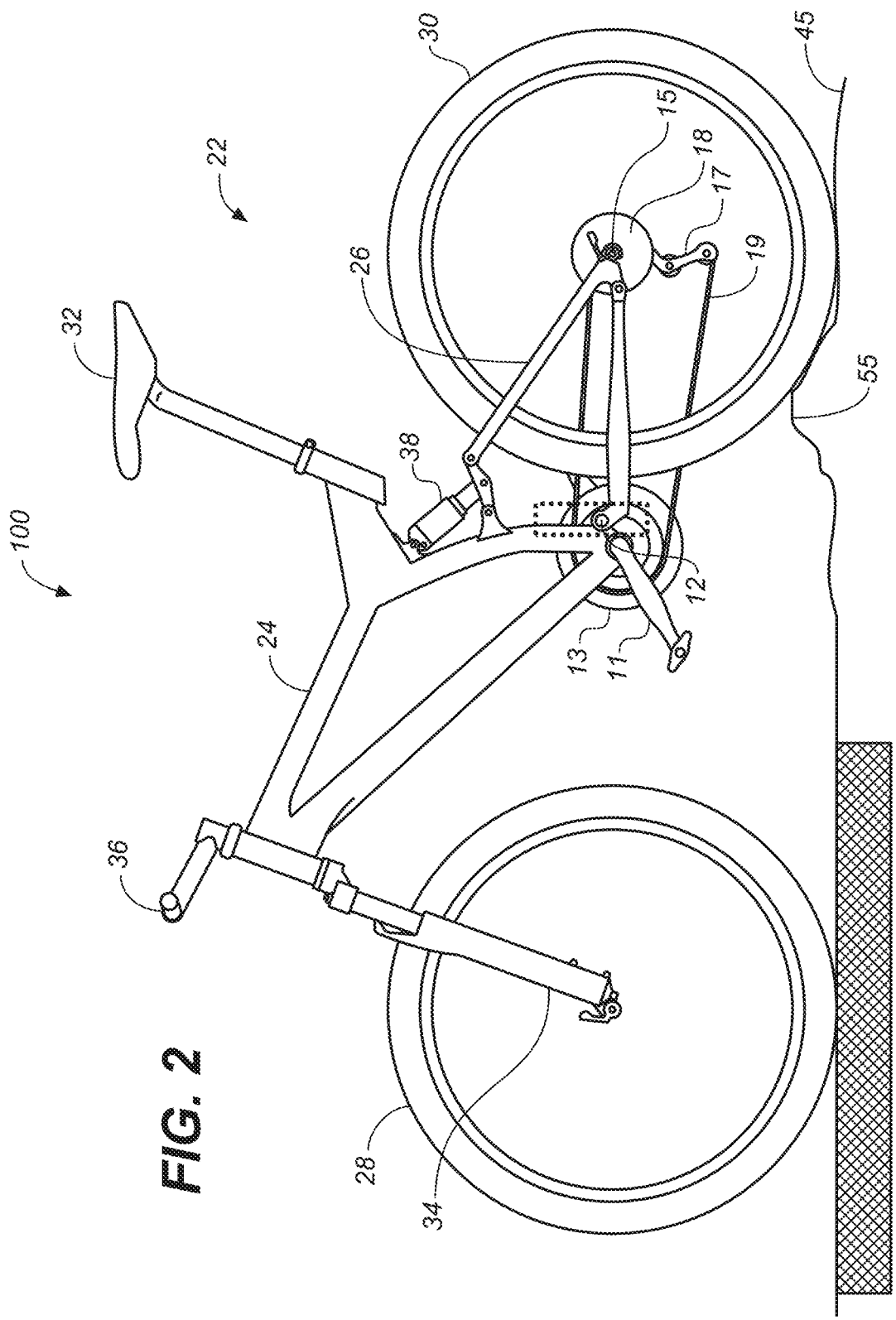
FIG. 2 is a perspective view of the bicycle having a suspended rear swing arm portion as it traverses across terrain, in accordance with an embodiment.

FIG. 2 illustrates bicycle 100 having a suspended rear swing arm portion 26 as it traverses across terrain 45 and encounters a terrain feature 55 shown in accordance with an embodiment. Terrain feature 55 may be a dip, rock, bump, sidewalk, hole, or any other type of feature that will cause an articulation in the rear suspension of bicycle 100. In general, terrain feature 55 will exert a force on rear wheel 30 of the bicycle 100. The angle of the resolved force relative to the rear wheel 30 is typically normal (substantially) to the rear wheel 30 at the point of impact. That force then imparts a component of the impact from terrain feature 55 to the axle 15 as dictated by the trajectory of the swing arm pivot point 12.

Although one type of rear suspension is shown herein it is for purposes of clarity. It should be appreciated that there may be many different ways of setting up a rear suspension. However, the following discussion is applicable to any rear suspension setup that has a swing arm pivot point 12 that is not located exactly at bottom bracket axis 11. That is, since the swing arm pivot point 12 is offset from the bottom bracket axis 11 (above, below, ahead, or behind) then when rear swing arm portion 26 rotates the chain stay length changes.

Figure 3B:
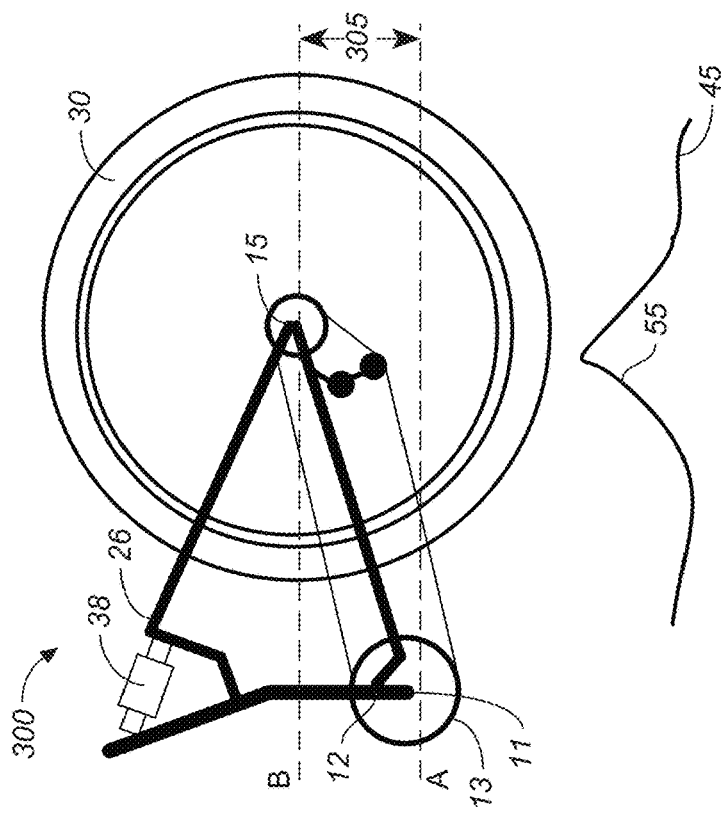
FIG. 3B is a side view of the suspended rear swing arm portion of the bicycle as it traverses across a terrain feature causing a suspension event that modifies the chain stay length, in accordance with an embodiment.
Figure 3A:
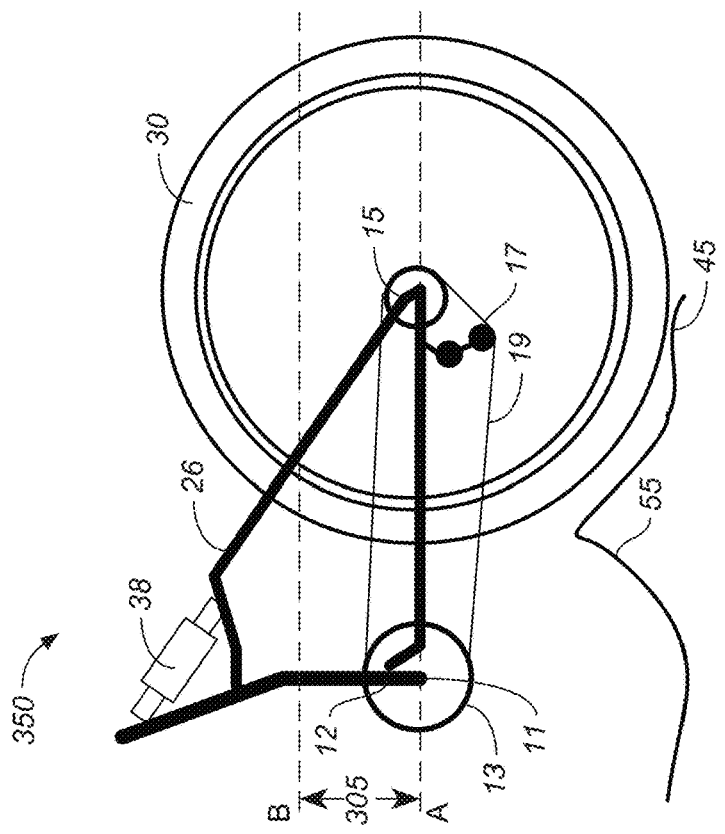
FIG. 3A is a side view of the suspended rear swing arm portion of the bicycle as it traverses across flat terrain, in accordance with an embodiment.

FIG. 3A is a side view 300 of the suspended rear swing arm portion 26 of the bicycle as it traverses across flat terrain 45 shown in accordance with an embodiment.

FIG. 3B is a side view 350 of the suspended rear swing arm portion 26 of the bicycle as it traverses across a terrain feature 55 causing a suspension event that modifies the chain stay length shown in accordance with an embodiment.

For example, the main pivot point 12 for bicycle 100 is slightly behind and higher than the bottom bracket axis 11. However, it could also include a couple of linkages and a number of different articulations. As such, 10 inches of rear travel 305 is not uncommon in a rear suspension bike. However, since the rear can travel throughout the 10-inch range, the chain stay length will change. For example, from the shortest distance when the bike is sitting to a longer distance when there is weight on the suspension, e.g., a rider on the bike, when bumps are hit, when pedal bob occurs, etc.

As chain length grows, e.g., due to a suspension change, the rider pedaling the bike will feel the motion of the suspension causing a change in the pressure on the pedal. During a high or quick levels of suspension movement (e.g., hitting a large rock, tree branch, pothole, and the like), the brisk change in suspension configuration and chain stay length will provide a significant pedal pressure change which could cause a rider to lose balance and possibly even crash. Moreover, the equally quick return of the suspension to the normal state after the bump is encountered could cause the chain to come free of the front or rear sprockets.

Figure 4A:
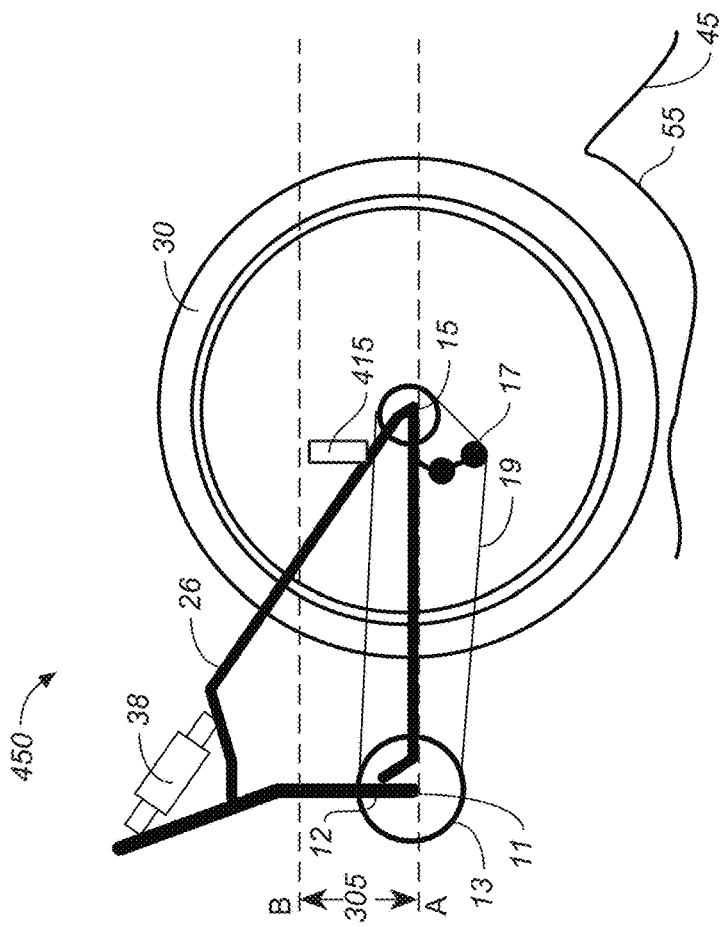
FIG. 4A is a side view of the suspended rear swing arm portion of the bicycle as it traverses across a terrain feature having a suspension event that modifies the chain stay length, in accordance with an embodiment.

FIG. 4A is a side view 400 of the suspended rear swing arm portion 26 of the bicycle as it traverses across a terrain feature 55 having a suspension event that modifies the chain stay length shown in accordance with an embodiment.

Figure 4B:
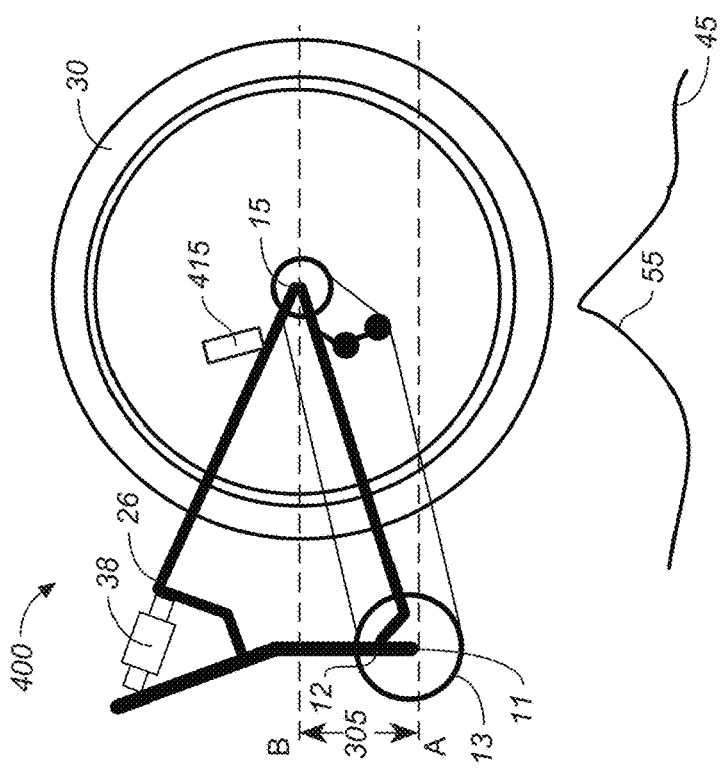
FIG. 4B is a side view of the suspended rear swing arm portion of the bicycle as it returns to flat terrain after the terrain feature suspension event, in accordance with an embodiment.

FIG. 4B is a side view of the suspended rear swing arm portion of the bicycle as it returns to flat terrain 45 after the terrain feature 55 suspension event shown in accordance with an embodiment. The rear derailleur assembly 17, using one or more spring, provides tension in the chain 19 for gear changing and suspension change events. However, in a large suspension change event such as after contacting terrain feature 55 (e.g., hitting a bump causing a quick suspension articulation change), the spring pressure within the rear derailleur is not always able to keep up with the change in chain stay length. In one case, the quick change in chain stay length as the suspension travels back from B to A over rear travel 305 will result in a relaxing in the pressure on the chain 19 which will travel along chain 19 to the front sprocket assembly 13 and cause the chain 19 to disengage from the front sprocket assembly 13.

One solution utilizes a friction clutch in the rear derailleur assembly 17 to reduce the release in chain pressure, thereby stopping chain 19 from getting enough slack to disengage from the front sprocket assembly 13. However, the use of the clutch restricts chain stay length growth. For example, as shown in FIGS. 3A and 3B when bicycle 100 encounters terrain feature 55 and initially distance of rear travel 305 from A to B, the necessary amount of chain will have to increase as the chain stay length increases to keep up with the suspension articulation. However, if there is a clutch restricting the chain stay length growth, the encounter with terrain feature 55 will cause the suspension to put excessive force on chain 19 during the suspension articulation, the excessive force can cause chain damage, sprocket damage, or reduce the suspension travel length providing a harsher ride over the terrain feature.

FIGS. 4A and 4B also include a sensor 415, such as an accelerometer, an optical detection (e.g., infrared motion sensor), an image capturing device (e.g., optical flow), a combination thereof, or the like. In one embodiment, sensor 415 detects the amount of rotation and speed of rotation of the rear axle. In another embodiment, sensor 415 can determine the angle of swing arm portion 26. For example, is the swing arm portion 26 tilted in a manner that would suggest the bicycle 100 is going down a small incline (5-15 degrees), down a medium incline (16-30 degrees), down a large incline (31-90 degrees), traversing a flat section, going up a small incline (5-15 degrees), going up a medium incline (16-30 degrees), going up a large incline (31-90 degrees), etc. Although a number of degrees are provided to indicate three different levels of slope, it should be appreciated that there may be more of fewer different breakdowns of slope measurement. For example, in the simplest case it could be whether it is a downward slope (descending) or an inclined slope (ascending). In a more complicated example, there could be different levels for every 5 degrees, 7 degrees, 10 degrees, 15 degrees, or the like). In one embodiment, sensor 415 could determine whether or not the chain is being rotated based on whether the pedals are moving or are stationary, etc.

Sensor 415 may be positioned proximate a rear axle 15 of the bicycle 100 for sensing changes in terrain. As shown in FIGS. 4A and 4B, sensor 415 is mounted on swing arm portion 26 proximate the rear axle 15 of the bicycle. In one embodiment the angular orientation of a sensor 415 sensing axis is movable through a range or angle thereby allowing alteration of a force component sensed by sensor 415 in relation to a force (vector) input into the rear swing arm portion 26. It is understood that sensor 415 may be moved or mounted in any suitable configuration and allowing for any suitable range of adjustment as may be desirable. It is understood that the sensor may include one, two, three or more sensing axis'. That is useful for adjusting the sensitivity of sensor 415 to various anticipated terrain and bicycle speed conditions. The bicycle speed affects the vector direction of a force input to the bicycle wheel for constant amplitude terrain feature 55 or "bump/dip." Varying size bumps and dips also affect the vector input angle to the wheel for constant bicycle speed. The movement of swing arm portion 26 is however limited to a mechanically determined trajectory. In one embodiment, sensor 415 may be coupled to the rear suspension, such as shock absorber and/or damper assembly 38, for measuring the operational characteristics of the rear suspension.

Sensor 415 can be any suitable force or acceleration transducer (e.g. strain gage, Wheatstone bridge, accelerometer, hydraulic cylinder, interferometer based, optical, thermal, and acoustic or any suitable combination thereof). Sensor 415 may utilize solid state electronics, electromechanical principles, or any other suitable mechanisms. In one embodiment, sensor 415 is a single axis self-powered accelerometer, such as for example ENDEVCO Model 2229C. The 2229C is a comparatively small device with overall dimensions of about 15 mm height by 10 mm diameter, and weighs about 4.9 g. Its power is self-generated and therefore the total power requirements for the bicycle 100 are reduced; this is an important advantage, at least for some types of bicycle, where overall weight is a concern. In one embodiment, the single axis accelerometer comprises the ENDEVCO 12M1A, which is of the surface-mount type. The 12M1A is a single axis accelerometer comprising a bimorph sending element which operates in the bender mode. This accelerometer is particularly small and light, measuring about 4.5 mm by 3.8 mm by 0.85 mm, and weighs about 0.12 g. In other embodiments, sensor 415 is a tri-axial accelerometer such as the ENDEVCO 67-100. This device has overall dimensions of about 23 mm length and 15 mm width, and weighs about 14 g. Other sensors known in the art may be used with the embodiments described herein.

In one embodiment, sensor 415 is attached to swing arm portion 26 directly, to any link thereof, to an intermediate mounting member or to any other portion or portions of the bicycle as may be useful for purposes disclosed herein. In one embodiment sensor 415 is fixed to an unsprung portion of the bicycle 100, such as for example swing arm portion 26, and another sensor 415 (such as an accelerometer as described above) is fixed to a sprung portion of the bicycle, such as for example the frame 24 of FIG. 1 or 2. Data from each sensor can, by a processor, be overlaid on a common time datum and suspension damping and/or spring effectiveness can be evaluated by comparing the data from the sensors on either "side" of the suspension unit. Sensors may be integrated with the vehicle structure and data processing system as described in U.S. Pat. Nos. 6,863,291; 4,773,671; 4,984,819; 5,390,949; 5,105,918; 6,427,812; 6,244,398; 5,027,303; and 6,935,157. Sensors and valve actuators (e.g. electric solenoid or linear motor typenote that a rotary motor may also be used with a rotary actuated valve) may be integrated herein utilizing principles outlined in SP-861-Vehicle Dynamics and Electronic Controlled Suspensions SAE Technical Paper Series no. 910661 by Shiozaki et al. for the International Congress and Exposition, Detroit, Michigan, Feb. 25-Mar. 1, 1991.

In operation, sensor 415 puts out a voltage change corresponding to an input force. For example, the outputs from one or more sensor 415 are reconciled in a controller or processor, such as a microprocessor, having an algorithm for weighting their respective inputs and generating a resulting singular command or signal based on a predetermined logic. In one embodiment, sensor 415 senses an input force along the prescribed range or axis. A terrain feature 55 (e.g., bump) in the terrain 45 typically exerts a force on a rear wheel 30 of the bicycle 100 (as shown in FIGS. 4A and 4B. The angle of the resolved force from terrain feature 55 relative to the rear wheel 30 is typically normal (substantially) to the rear wheel 30 at the point of impact. That force then imparts a component of the impact of terrain feature 55 to the axle 15 as dictated by the trajectory of the swing arm portion 26. That component can be sensed by sensor 415 at a magnitude corresponding to the orientation of the sensor range or angle. The sensor axis orientation can be adjusted to make sensor 415 more or less sensitive to bumps and dips in the terrain.

With reference now to FIGS. 5A and 5B and to FIG. 1, two different perspective views of a disengageable derailleur assembly 17 are shown in accordance with an embodiment. In general, disengageable derailleur assembly 17 has a linkage mechanism attempting to position the rear derailleur to the left from the perspective of a rider on bicycle 100. A cable attached to a shifter on the handlebar assembly 36, or hydraulic actuator connected to a shifter designed actuate the hydraulic actuator, or an electronic positioning motor connected to a shifter switch and controller, positions derailleur assembly 17 into the correct position for the corresponding cog the rider is trying to choose. Disengageable derailleur assembly 17 includes a frame attachment portion 505, a P-Knuckle assembly 510, a cage assembly 565 (which includes inner and outer cage plates 563, lower idler pully 520, and upper idler pully 520a. In one embodiment, frame attachment portion 505 is coupled with swing arm portion 26. In one embodiment, frame attachment portion 505 is part of the P-Knuckle assembly 510.

Lower idle pully 520 (and similarly upper idle pully 520a) includes a cog having a plurality of teeth on an outer perimeter thereof, the cog provides continuous rotating contact with chain 19 of bicycle 100. In one embodiment, lower idle pully 520 is horizontally adjustable across a number of rear sprocket 18 coupled with rear wheel 30 of bicycle 100. In one embodiment, disengageable derailleur assembly 17 has an upper idle pully 520a proximal to the joint where P-Knuckle assembly 510 is located.

FIG. 6 is an exploded view of disengageable derailleur assembly 17 shown in accordance with an embodiment. In one embodiment, disengageable derailleur assembly 17 includes P-Knuckle assembly 510 and cage assembly 565.

In one embodiment, P-Knuckle assembly 510 includes a P-Knuckle housing 615, a motor and gear 610, a spring (or solenoid) housing 620, a linear solenoid 625, a torsional power spring 630, a P-Knuckle clutch plate 635 (with gear), at least one thrust bearing 640, and a P-Knuckle cover 644.

In one embodiment, cage assembly 565 includes a cage bearing 645, a cage plate 650, at least one snap ring 655, inner and outer cage plates 563, lower idler pully 520, and upper idler pully 520a.

In one embodiment, during the disengagement process, cage plate 650 will decouple the cage assembly 565 from the P-Knuckle assembly 510 though the axial movement of the P-Knuckle clutch plate 635. Thus, for a given gear selection only the cage assembly 565 would move relative to the bicycle frame, while the P-Knuckle assembly 510 would be disengaged during a chain growth or reduction event.

Although a plurality of different components is shown and described, it should be appreciated that disengageable derailleur assembly 17 can have more of fewer components. For example, a number of the components shown could be combined to a single component or could be broken from one into a plurality of components. Moreover, disengageable derailleur assembly 17 could include more of fewer of the components shown. The use of the designated separate components defined as being part of P-Knuckle assembly 510 and cage assembly 565 in the discussion is provided as one embodiment, and is shown merely for purposes of clarity. It should be appreciated that in one embodiment, one or more of the components could be moved into the opposite assembly.

Figure 7:
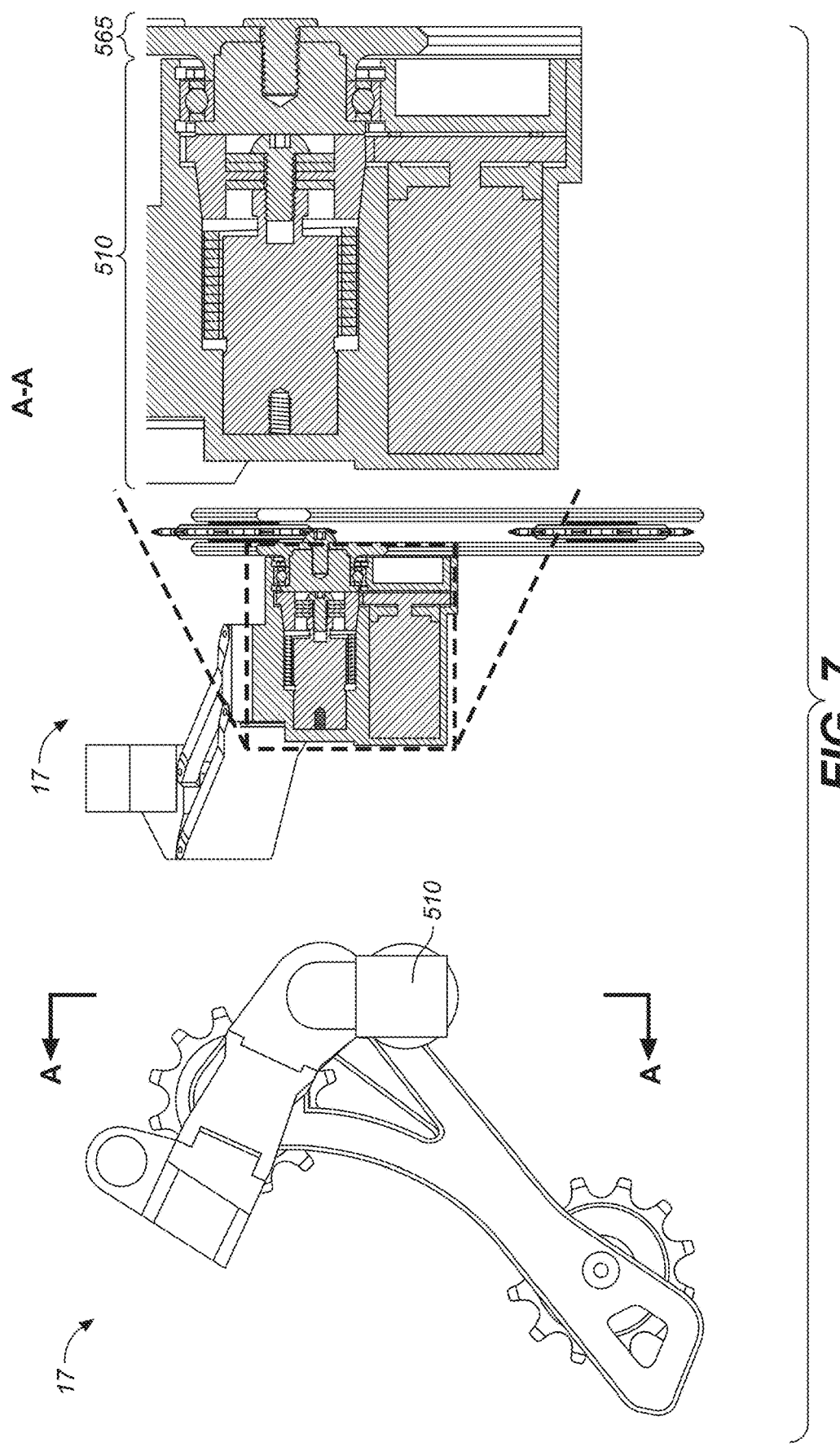
FIG. 7 is a cutaway view of P-Knuckle assembly of the disengageable derailleur assembly which includes a portion of cage assembly, in accordance with an embodiment.

Referring now to FIG. 7, a cutaway view A-A of P-Knuckle assembly 510 of the disengageable derailleur assembly 17 which includes a portion of cage assembly 565 is shown in accordance with an embodiment. The operation of the P-Knuckle assembly 510 as seen in the sectional view A-A is shown in two different orientations in FIGS. 8 and 9 and is described in the discussion thereof.

Figure 8:
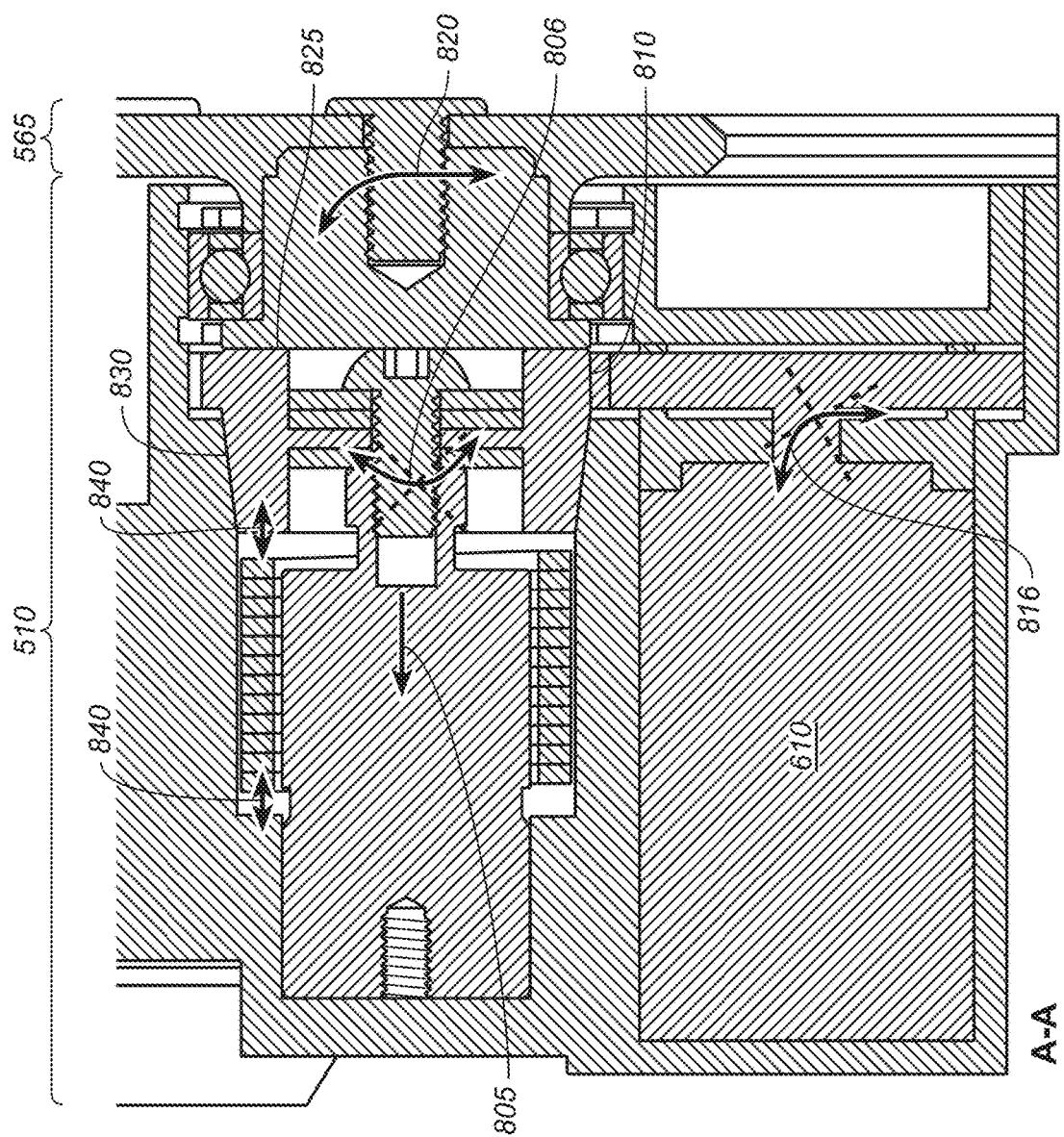
FIG. 8 is a side sectional view of the P-Knuckle assembly of the disengageable derailleur assembly which also includes a portion of cage assembly in a cage free configuration, in accordance with an embodiment.

With reference now to FIG. 8, a side sectional view A-A of the P-Knuckle assembly 510 of the disengageable derailleur assembly 17 which also includes a portion of cage assembly 565 is shown in accordance with an embodiment. In FIG. 8, a cage free configuration is shown in accordance with an embodiment. In one embodiment, the cage free configuration shows a left force 805, a gear interface 810, motor and gear 610, a clearance 825, a frictional interface 830, a locking 806 of linear solenoid 625, a locking 816 of motor and gear 610, a cage rotation axis 820, and mechanical connections 840.

In FIG. 8, cage assembly 565 rotates freely about the axis indicated by cage plate rotation 820. During disengagement, one embodiment will frictionally decouple the cage assembly 565 from the P-Knuckle assembly 510 though the axial movement of the P-Knuckle clutch plate 635 via torsional power spring 630. In one embodiment, during the disengagement, a controller (that is, in one embodiment, part of linear solenoid 625) senses and stores position of P-Knuckle assembly 510 with respect to cage assembly 565 at disengagement to ensure a proper orientation during a later re-engagement.

Figure 9:
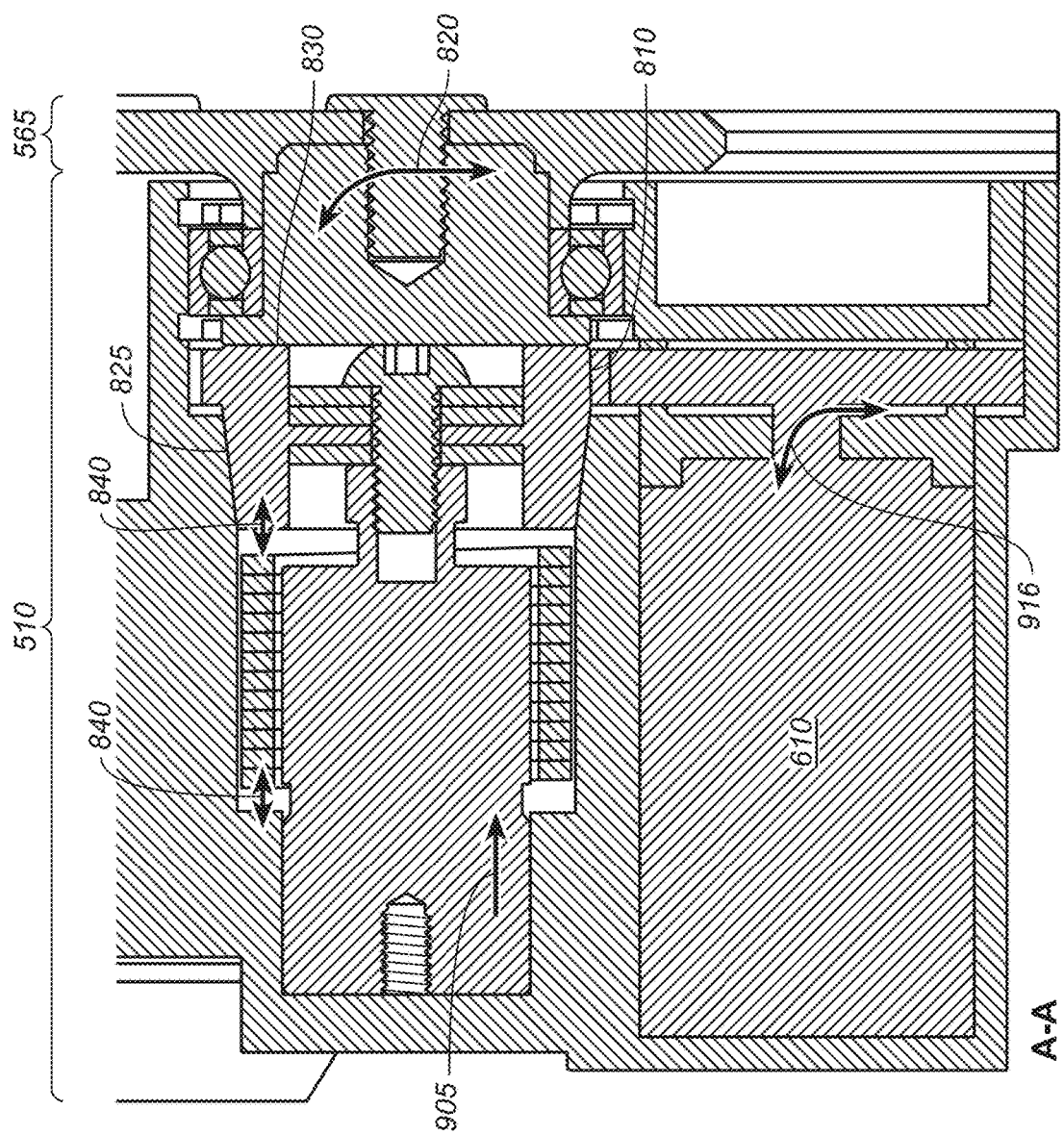
FIG. 9 is a side sectional view of the P-Knuckle assembly of the disengageable derailleur assembly which also includes a portion of cage assembly in a cage sprung configuration, in accordance with an embodiment.

Referring now to FIG. 9, a side sectional view A-A of the P-Knuckle assembly 510 of the disengageable derailleur assembly 17 which also includes a portion of cage assembly 565 is shown in accordance with an embodiment. In FIG. 9, a cage sprung configuration is shown in accordance with an embodiment. In one embodiment, the cage sprung configuration shows a right force 905, gear interface 810, motor and gear 610, clearance 825, frictional interface 830, the unlocking 916 of motor and gear 610, free cage rotation 820, and mechanical connections 840.

In FIG. 9, cage assembly 565 rotate about the axis indicated by cage rotation 820 under a spring force. During re-engagement one embodiment will frictionally couple the cage assembly 565 to the P-Knuckle assembly 510 using torsional power spring 630 through movement of P-Knuckle clutch plate 635. In one embodiment, motor and gear 610 engages to restore timing of cage assembly 565 and torsional power spring 630 using clutch plate 635. In addition to the difference in the force direction, in the cage sprung configuration, the friction interface 830 and clearance 825 are switched.

In one embodiment, in order to compensate for the engagement and disengagement, disengageable derailleur assembly 17 will lock torsional power spring 630 to itself once cage assembly 565 is frictionally disengaged from P-Knuckle assembly 510 to keep the appropriate preload. In one embodiment, the appropriate preload maintenance is implemented through linear solenoid 625 and opposing frictional clutch-type (in a traditional, auto-sense) clutch plate 635. For example, once cage assembly 565 is frictionally disengaged from P-Knuckle assembly 510 by disengaging cage assembly 565 from torsional power spring 630, the timing of both the cage assembly 565 and the torsional power spring 630 would need to be kept synchronized for reengagement so that torsional power spring 630 will have the same force on it once P-Knuckle assembly 510 is reengaged with cage assembly 565. If the timing is not maintained there is a risk of torsional power spring 630 winding all the way up or all the way down and giving cage assembly 565 either nowhere to move, or no actual spring force, respectively. In one embodiment, the maintenance of the orientation of cage assembly 565 with the appropriate force on torsional power spring 630 is maintained by simultaneously disengaging torsional power spring 630 from cage assembly 565 and engaging torsional power spring 630 with something else in P-Knuckle assembly 510 such as P-Knuckle 615 housing (or the like) to keep the proper preload on torsional power spring 630 and vice versa for the reengagement of cage assembly 565 with P-Knuckle assembly 510.

For example, the bicycle is approaching a series of logs and the rear suspension is going to be working. Over the first log, cage assembly 565 frictionally disengages from P-Knuckle assembly 510 and the rear suspension is compressed to 25 degrees. While the suspension is compressed 25 degrees, the rider begins to pedal which causes cage assembly 565 to frictionally reengage with P-Knuckle assembly 510 at 15 degrees. If this continued for each log, and without any type of error correction, at some point torsional power spring 630 would be either packed or unpacked.

In order to overcome this issue, in one embodiment, the frictional reengaging of torsional power spring 630 with cage assembly 565 will occur before the disengagement of P-Knuckle 615 housing with torsional power spring 630. In so doing, there is no time during the engagement/disengagement/reengagement process that torsional power spring 630 and cage assembly 565 are not maintaining their correct orientation. Thus, the risk of torsional power spring 630 winding all the way up or down due to an improper engagement/disengagement/reengagement is removed. Moreover, this process removes the opportunity for the torsion power spring 630 to be packed or unwound due to several uncoordinated engagement/disengagement/reengagement occurrences.

In one embodiment, the sensor 415 is used to track the orientation of the suspension and the tracking information is provided to a controller for motor and gear 610 which will allow P-Knuckle assembly 510 to establish the proper timing on torsional power spring 630 prior to the frictional re-engagement of P-Knuckle assembly 510 with cage assembly 565.

In another embodiment, wave dynamics of the chain itself can be used to manage the frictional disengagement and reengagement. For example, disengageable derailleur assembly 17 can actively, automatically, and continually adjust the position of P-Knuckle assembly 510 with respect to the position of cage assembly 565 based on suspension position and gearing such that the system will always have the correct amount of chain paid out. This would minimize chain slap and could eliminate load on the whole suspension system. In one embodiment, this is realized by using a stepper motor & controller (e.g., motor and gear 610) which receives input from both from a gear selection and a suspension position (e.g., information from sensor 415) to give the disengageable derailleur assembly 17 some tolerance if sampling rates of the system could not create an effective "continuous" signal. Thus, if disengageable derailleur assembly 17 is active, rather than cage assembly 565 and P-Knuckle assembly 510 being engaged or disengaged based on pedaling, cage assembly 565 and P-Knuckle assembly 510 would be frictionally disengaged for compressions/chain growth and reengaged for rebound/chain shrink.

In one embodiment, disengageable derailleur assembly 17 remains engaged under normal chain stay length changes such as suspension articulation due to pedaling, normal suspension travel issues, and the like. However, when a significant suspension event occurs, e.g., hitting a large bump causing a large, quick articulation of the suspension, P-Knuckle assembly 510 will not provide significant damping during the chain length extension (as would occur when the suspension travels as shown from FIG. 3A to FIG. 3B). However, when the suspension returns (e.g., travels from FIG. 4A to FIG. 4B) P-Knuckle assembly 510 will increase the resistance to chain 19, thereby stopping chain 19 from obtaining enough slack to disengage from front sprocket assembly 13 or rear sprocket 18.

In one embodiment, the damping force is automatically controlled by a controller in response to the input from sensor 415 when the bicycle 100 is in use. Optionally, the user may be able to override and/or adjust this automatic control using a manual input. For example, when sensor 415 puts out a voltage corresponding to terrain feature 55 (e.g., a bump, a dip, etc.) that voltage is transmitted to a controller (e.g. a memory and a processor/microprocessor, or an ASIC). In one embodiment, P-Knuckle assembly 510 is responsive to signals and power transmitted from the controller or processor. As the values increase or decrease, an electromagnetic circuit is used to engage or disengage the cage assembly 565 and P-Knuckle assembly 510 which reduces the influence that the engaged P-Knuckle assembly 510 will have on the suspension articulation.

Some or all of components of embodiments herein including sensor 415, P-Knuckle assembly 510, and the like are interconnected or connected by wire, wireless, WAN, LAN, Bluetooth, Wi-Fi, ANT (i.e. GARMIN low power usage protocol), or any suitable power or signal transmitting mechanism.

Although a plurality of different components is shown and described, it should be appreciated that disengageable derailleur assembly 17 can have more of fewer components. For example, a number of the components shown could be combined to a single component or could be broken from one into a plurality of components. Moreover, disengageable derailleur assembly 17 could include more of fewer of the components shown. The use of the designated separate components in the discussion is provided as one embodiment, of many possible and is shown merely for purposes of clarity.

Figure 10:
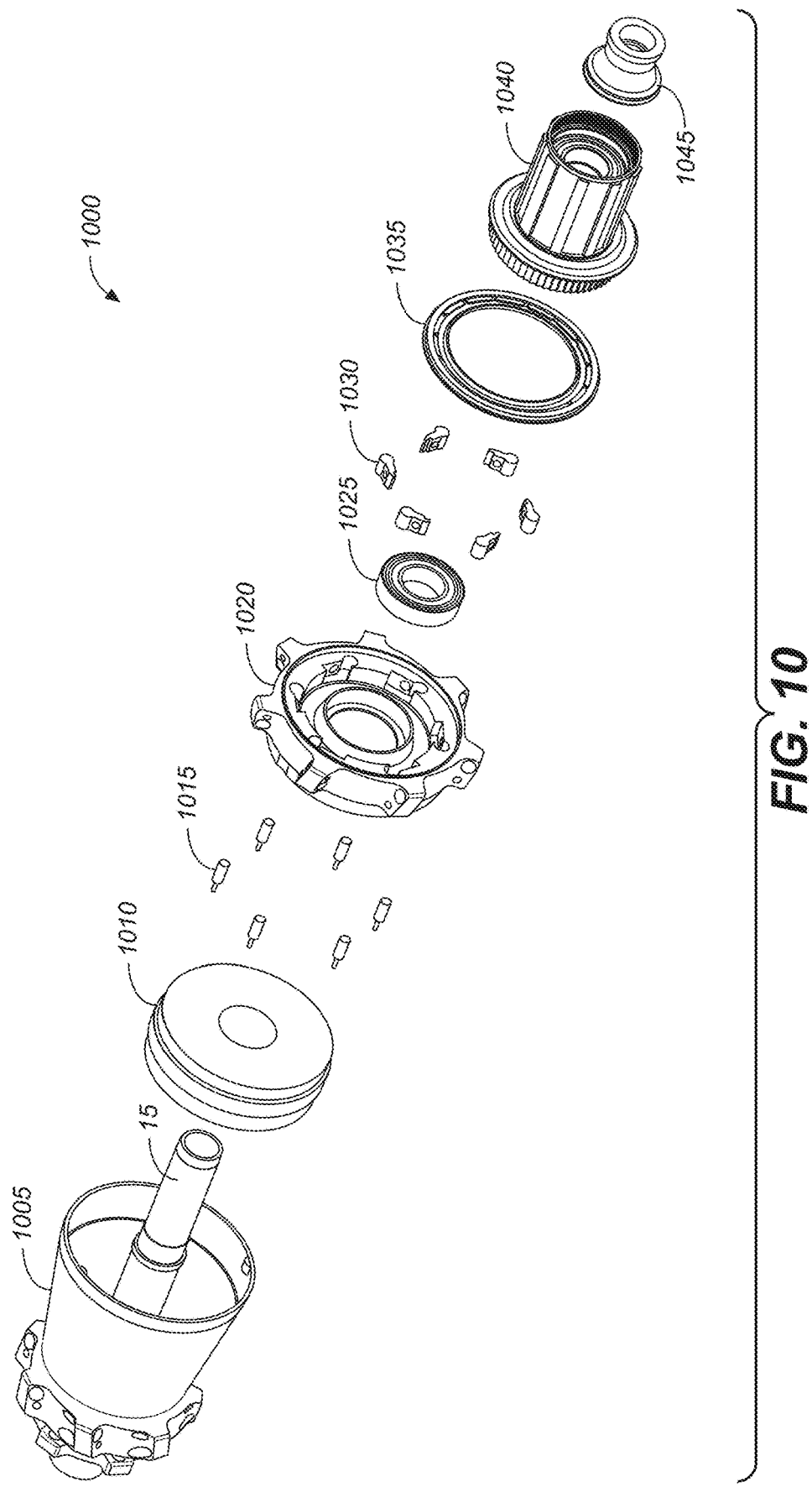
FIG. 10 is an exploded view of an electronic automatically decoupling hub assembly, in accordance with an embodiment.

With reference now to FIG. 10, an exploded view of an electronic automatically decoupling hub assembly 1000 is shown in accordance with an embodiment. In FIG. 10, electronic automatically decoupling hub assembly 1000 includes an axle 15, a hub shell non drive side (NDS) 1005, a controller 1010, one or more inductors/electromagnets 1015, a cassette body assembly 1040 (e.g., a hub shell drive side (DS)), a bearing 1025, one or more pawls 1030 (whose number, in one embodiment, may be analogous to the number of inductor/electromagnets 1015), a seal 1035, a cassette body assembly 1040, and an end cap 1045. In one embodiment, electronic automatically decoupling hub assembly 1000 uses magnets in each of the pawls 1030 with an inductors/electromagnets 1015 above it and controlled by a controller 1010 inside the hub shell NDS 1005. When not pedaling the pawls 1030 would be disengaged by the inductors/electromagnets 1015 turning on or flipping polarity to attract the pawls 1030 upwards away from the cassette body assembly 1040. When pedaling the inductors/electromagnets 1015 would be turned off and the magnets of pawls 1030 attracted to the ferrous cassette body assembly 1040 (less energy usage). Or the polarity of the inductors/electromagnets 1015 could be flipped to repel the pawls 1030 away, forcing them toward the cassette body assembly 1040.

Rear axle 15 is described previously herein. Hub shell NDS 1005 is the left side of the hub.

Controller 1010 provides power/or polarity to the inductor/electromagnets and could house a battery, dynamo, or generator to provide a charge to a battery or create its own power. Further operation of controller 1010 is provided below.

One or more inductors/electromagnets 1015 which receive input from controller 1010 to engage/disengage the pawls 1030 with respect to the cassette body assembly 1040.

Cassette body assembly 1040 provides a number of teeth to receive the pawls 1030. In general, bigger teeth and pawls will deal better with larger amounts of torque, while a finer set up provides faster engagement. Bearing 1025 is used to maintain cassette body assembly 1040 about the axle 15.

One or more pawls 1030 are used to engage with the teeth of cassette body assembly 1040. Although 6 pawls 1030 are shown that number is exemplary. To produce a faster pick-up in one embodiment, the pawls 1030 are offset to double the number of engagements per revolution.

Seal 1035 is used to keep dirt out while also keeping pawls 1030 from falling out or being lost when the hub is disassembled.

Cassette body assembly 1040 is used to hold the cassette cogs. In one embodiment, the cassette body assembly 1040 includes splines thereon to mechanically couple with the cassette cogs.

End cap 1045 is used to prevent dust and water from entering into electronic automatically decoupling hub assembly 1000.

In one embodiment, controller 1010 provides a polarity to inductors/electromagnets 1015 that push or pull pawls 1030 into an engaged position, or they are spring loaded to provide inductors/electromagnets 1015 to engage/disengage the pawls 1030. The cassette body assembly 1040 is a ferrous material that attracts the (magnetic) pawls 1030 to the cassette body assembly 1040, while the electromagnetic controller 1010 on the other side will provide an electromagnetic force via inductors/electromagnets 1015 that can be used to attract the magnetic pawls 1030. In one embodiment, the electromagnetic force could be used to engage the pawls 1030 with cassette body assembly 1040 when pawls 1030 are retracted when in a resting state. In another embodiment, the electromagnetic force could be used to disengage the pawls 1030 from cassette body assembly 1040 when pawls 1030 are deployed when in a resting state.

In one embodiment, electronic automatically decoupling hub assembly 1000 is mechanical and the pawls 1030 are engaged or disengaged electronic automatically through a serious of stepper motors, a single stepper motor with a series of linkages to drive each of the pawls 1030 simultaneously. In yet another embodiment, the engagement/disengagement of the pawls 1030 could be solenoid induced, etc. In one embodiment, pawls 1030 can be engaged and/or disengaged electronic automatically based on input from sensor 415.

For example, the sensor 415 output can be used by a processor in electronic automatically decoupling hub assembly 1000. Moreover, the activation can be at a number of different levels and as such, the electronic automatically decoupling hub assembly 1000 could have a nearly infinite amount of automatic engagement and disengagement, in real-time, and throughout the ride. As such, the rider would have all of the normal suspension articulation during most of the ride and when different levels of violent suspension articulation events occurred, the chain pressure via the electronic automatically decoupling hub assembly 1000 would be reduced to ensure full suspension articulation while also minimizing the opportunity for a violent feedback through the pedals that would be transferred to the rider.

In one embodiment, the damping force is electronic automatically controlled by controller 1010 in response to the input from sensor 415 when the bicycle 100 is in use. Optionally, the user may be able to override and/or adjust this automatic control using a manual input. For example, when sensor 415 puts out a voltage corresponding to terrain feature 55 (and/or optionally a dip, a downhill slope, an uphill slope, a coasting area, and the like) that voltage is transmitted to controller 1010 (e.g. a memory and a processor/microprocessor, or an ASIC). In one embodiment, electronic automatically decoupling hub assembly 1000 engages or disengages pawls 1030 with cassette body assembly 1040 responsive to signals and power transmitted from the controller 1010. In one embodiment, controller 1010 compares the output voltage of sensor 415 to a plurality of preset values. As the values increase, an electromagnetic circuit is used to engages or disengages pawls 1030 with cassette body assembly 1040.

In one embodiment, when the output voltage of sensor 415 falls below a preset value, the electromagnetic circuit is used to engage or disengage pawls 1030 with respect to cassette body assembly 1040. In one embodiment, some or all of components including sensor 415, controller 1010, and the like are interconnected or connected by wire, wireless, WAN, LAN, Bluetooth, Wi-Fi, ANT (i.e. GARMIN low power usage protocol), or any suitable power or signal transmitting mechanism.

Although a plurality of different components is shown and described, it should be appreciated that electronic automatically decoupling hub assembly 1000 can have more of fewer components. For example, a number of the components shown could be combined to a single component or could be broken from one into a plurality of components. Moreover, electronic automatically decoupling hub assembly 1000 could include more of fewer of the components shown. The use of the designated separate components in the discussion is provided as one embodiment, of many possible and is shown merely for purposes of clarity.

Figure 11:
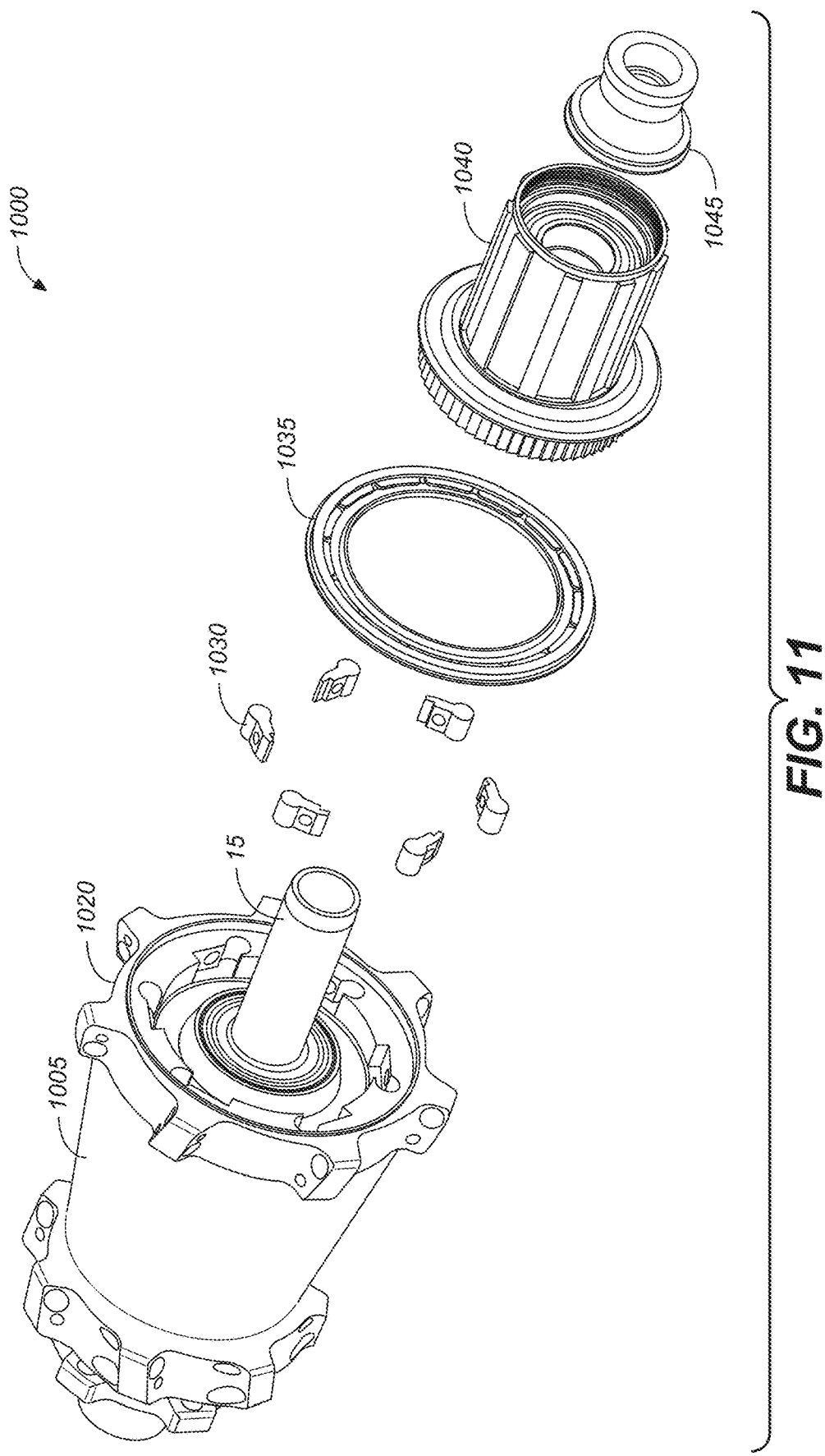
FIG. 11 is a partially exploded view of an electronic automatically decoupling hub assembly, in accordance with an embodiment.

Referring now to FIG. 11, a partially exploded view of an electronic automatically decoupling hub assembly 1000 is shown in accordance with an embodiment. In one embodiment, electronic automatically decoupling hub assembly 1000 of FIG. 11 shows axle 15, hub shell NDS 1005, controller 1010, one or more inductors/electromagnets 1015, and ratchet ring 1020 and bearing 1025 in proper orientation and build. In addition, FIG. 11 shows the exploded view of the one or more pawls 1030, seal 1035, cassette body assembly 1040, and end cap 1045.

Figure 12:
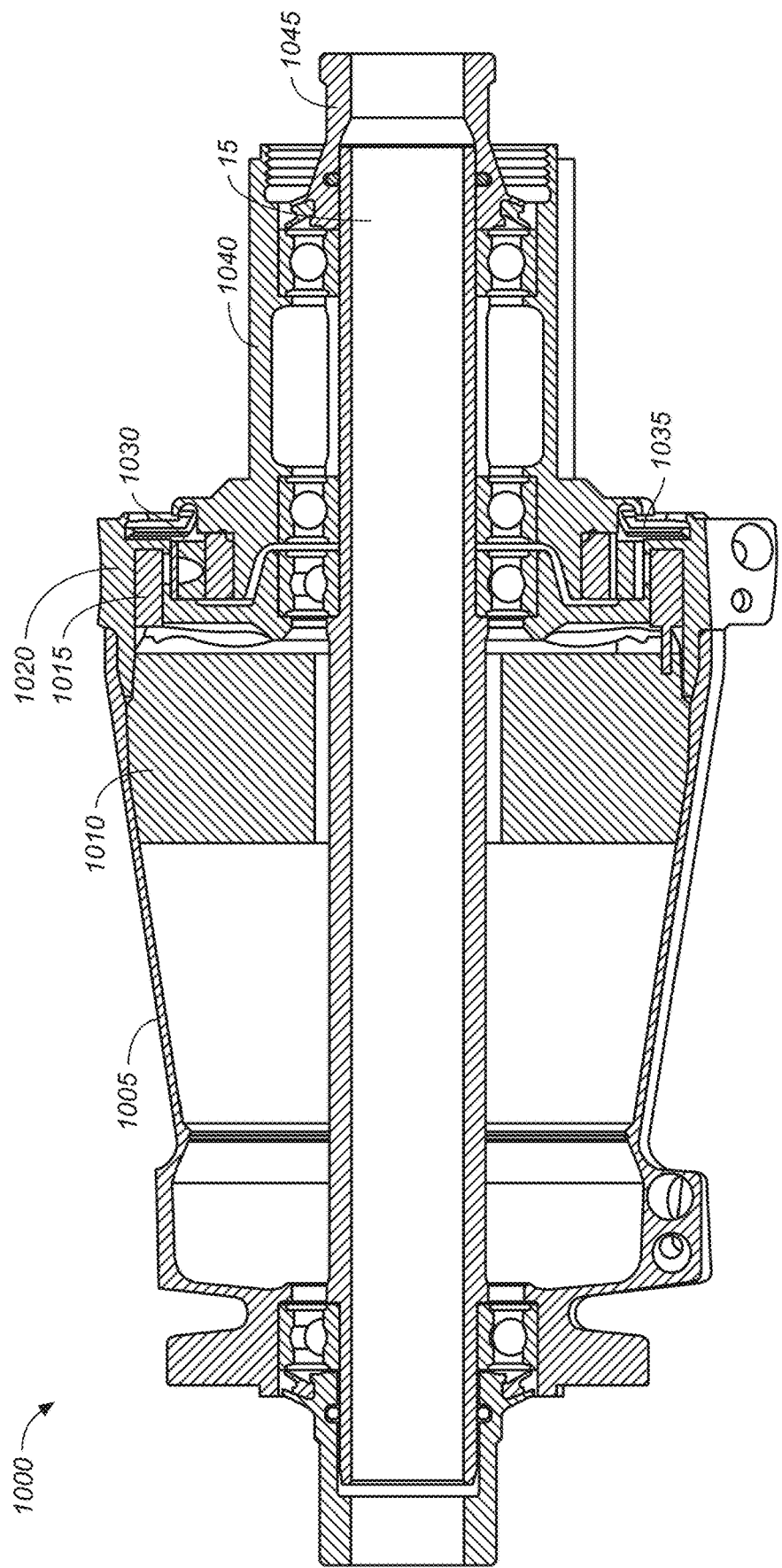
FIG. 12 is a full section view of an electronic automatically decoupling hub assembly, in accordance with an embodiment.

With reference now to FIG. 12, a full section view of an electronic automatically decoupling hub assembly 1000 is shown in accordance with an embodiment. In one embodiment, the section view of electronic automatically decoupling hub assembly 1000 of FIG. 12 shows all of the components of electronic automatically decoupling hub assembly 1000 in an as built orientation. The as built orientation shows axle 15, hub shell NDS 1005, controller 1010, one or more inductors/electromagnets 1015, ratchet ring 1020, bearing 1025, one or more pawls 1030, seal 1035, cassette body assembly 1040, and end cap 1045.

Figure 13:
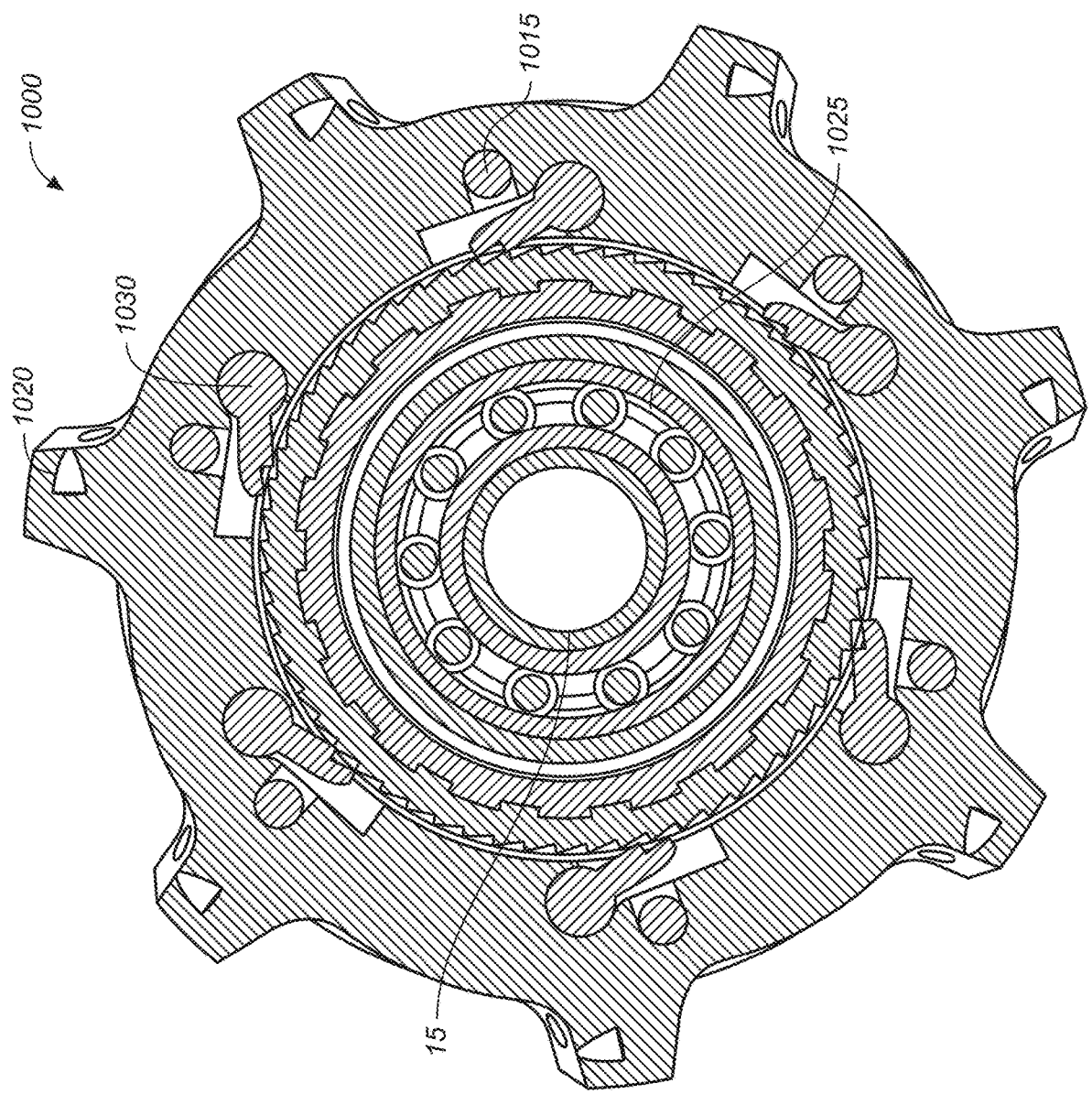
FIG. 13 is an opaque front view of an electronic automatically decoupling hub assembly, in accordance with an embodiment.

Referring now to FIG. 13, an opaque front view of an electronic automatically decoupling hub assembly 1000 is shown in accordance with an embodiment. In one embodiment, electronic automatically decoupling hub assembly 1000 of FIG. 13 includes an axle 15, one or more inductors/electromagnets 1015, ratchet ring 1020, bearing 1025, one or more pawls 1030.

Although described herein with respect to a bicycle suspension system, the embodiments illustrated in FIGS. 1-13 herein may be used with any type of suspended vehicle, as well as other types of suspension or damping systems.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. An electronic automatically decoupling hub assembly comprising:
   an axle;
   a hub shell rotationally positioned about the axle, said hub shell rotationally positioned about said axle on a non-drive side of said electronic automatically decoupling hub assembly;
   a bearing rotationally positioned about the axle, said bearing rotationally positioned about said axle on a drive side of said electronic automatically decoupling hub assembly;
   a cassette body assembly rotationally positioned about the bearing, the cassette body assembly having at least one tooth therein;
   an inductor comprising at least one pawl to selectively engage or disengage with the at least one tooth of the cassette body assembly;
   a selective disengagement of the at least one pawl from the at least one tooth of the cassette body assembly will cause the electronic automatically decoupling hub assembly to enter a freewheel state;
   a selective engagement of the at least one pawl with the at least one tooth of the cassette body assembly will cause the electronic automatically decoupling hub assembly to enter a force transfer state;
   a controller to provide at least one automatic signal to the inductor;
   the at least one automatic signal causing the inductor to engage or disengage the at least one pawl with the at least one tooth of the cassette body assembly;
   at least one sensor to provide an input to the controller, the input causing the controller to automatically provide the at least one automatic signal to the inductor, the sensor is selected from the group consisting of: an accelerometer, an optical detection device, and an image capturing device;
   a seal to contain the at least one pawl within the electronic automatically decoupling hub assembly;
   a ratchet ring; and
   an end cap coupled with the cassette body assembly, the end cap configured to prevent entry of contaminant into the electronic automatically decoupling hub assembly.

2. The electronic automatically decoupling hub assembly of claim 1, further comprising:
   the controller to provide at least one automatic activation signal; and
   the inductor to receive the at least one automatic activation signal and engage the at least one pawl with the at least one tooth of the cassette body assembly.

3. The electronic automatically decoupling hub assembly of claim 1, further comprising:
   the controller to provide at least one automatic deactivation signal; and
   the inductor to receive the at least one automatic deactivation signal and disengage the at least one pawl from the at least one tooth of the cassette body assembly.

4. The electronic automatically decoupling hub assembly of claim 1, further comprising:
   the controller to provide a plurality of automatic activation signals;
   the controller to provide a plurality of automatic deactivation signals; and
   the inductor to receive the plurality of automatic activation signals and the plurality of automatic deactivation signals and engage or disengage the at least one pawl with the at least one tooth of the cassette body assembly in accordance therewith.

5. The electronic automatically decoupling hub assembly of claim 1, further comprising:
   the cassette body assembly having a plurality of teeth therein; and
   the inductor comprising a plurality of pawls, the plurality of pawls to selectively engage or disengage with at least two of the plurality of teeth of the cassette body assembly.

* * * * *